US008037017B2

(12) United States Patent
Samn (10) Patent No.: US 8,037,017 B2
(45) Date of Patent: Oct. 11, 2011

(54) REAL-TIME CHAT AND CONFERENCE CONTACT INFORMATION MANAGER

(75) Inventor: Jonathan Samn, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 12/273,300

(22) Filed: Nov. 18, 2008

(65) Prior Publication Data

US 2009/0070421 A1 Mar. 12, 2009

Related U.S. Application Data

(63) Continuation of application No. 11/336,317, filed on Jan. 20, 2006, now Pat. No. 7,478,086, which is a continuation of application No. 10/081,021, filed on Feb. 21, 2002, now Pat. No. 7,051,049.

(51) Int. Cl.
*G06F 17/30* (2006.01)
(52) U.S. Cl. ..................................................... 707/607
(58) Field of Classification Search ................. 707/2, 4, 707/102, 607
See application file for complete search history.

(56) References Cited

U.S. PATENT DOCUMENTS

| | | | |
|---|---|---|---|
| 6,059,692 A | 5/2000 | Hickman | |
| 6,097,720 A | 8/2000 | Araujo et al. | |
| 6,131,096 A | 10/2000 | Ng et al. | |
| 6,301,609 B1 | 10/2001 | Aravamudan et al. | |
| 6,324,569 B1 | 11/2001 | Ogilvie et al. | |
| 6,404,884 B1 | 6/2002 | Marwell et al. | |
| 7,051,049 B2 | 5/2006 | Samn | |
| 7,272,637 B1 | 9/2007 | Himmelstein | |
| 7,275,083 B1 | 9/2007 | Seibel et al. | |
| 7,426,382 B2 | 9/2008 | Aerrabotu | |
| 7,478,086 B2 * | 1/2009 | Samn | 1/1 |
| 7,680,819 B1 | 3/2010 | Mellmer | |
| 2002/0025833 A1 | 2/2002 | Martin et al. | |
| 2002/0049751 A1 | 4/2002 | Chen et al. | |
| 2002/0087404 A1 | 7/2002 | Silkey et al. | |
| 2003/0158864 A1 | 8/2003 | Samn | |
| 2004/0078388 A1 | 4/2004 | Melman | |
| 2006/0031510 A1 | 2/2006 | Beck | |
| 2006/0116982 A1 | 6/2006 | Samn | |
| 2008/0126482 A1 | 5/2008 | O'Sullivan | |

OTHER PUBLICATIONS

USPTO; examination record of related U.S. Appl. No. 11/336,317, filed by Jonathan Samn on Feb. 24, 2006, now issued as 7,478,086.
USPTO, recent examination correspondence in related U.S. Appl. No. 12/274,436, filed on Nov. 20, 2008, by Jonathan Samn, currently under examination.
USPTO; examination record of related U.S. Appl. No. 10/081,021, filed by Jonathan Samn on Feb. 21, 2002, now issued as 7,051,049.
USPTO, Recent Examination Correspondence in Related U.S. Appl. No. 12/274,436.

* cited by examiner

*Primary Examiner* — Etienne LeRoux
(74) *Attorney, Agent, or Firm* — Robert H. Frantz; David A. Mims, Jr.; Mark C. Vallone (57) ABSTRACT

A real-time chat and conference contact information manager which, during a real-time online chat, online meeting, or online collaboration session between multiple participants, receives identification items associated with addition of a new participant; stores the received identification data item in a contact record in a local collaboration client contact list; triggered by the storing, extracts a search key value for each data item of the contact record, including at least an email address value associated with the new participant; uses the search key value to search a trusted administered contact information store for corresponding data items; and modifies the contact record to include the corresponding data items from said trusted administered contact information data store.

18 Claims, 5 Drawing Sheets

*Prior Art*

REAL-TIME CHAT AND CONFERENCE CONTACT INFORMATION MANAGER

CROSS-REFERENCE TO RELATED APPLICATIONS

CLAIMING BENEFIT UNDER 35 U.S.C. 120

This is a continuation of U.S. patent application Ser. No. 11/336,317, filed on Jan. 20, 2006, now U.S. Pat. No. 7,478,086, currently under notice of allowance, which was a continuation of U.S. patent application Ser. No. 10/081,021, filed on Feb. 21, 2002, now issued as U.S. Pat. No. 7,051,049, both of which were filed by Jonathan Samn.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related applications, U.S. patent application Ser. No. 11/336,317, filed on Jan. 20, 2006, and U.S. patent application Ser. No. 10/081,021, filed on Feb. 21, 2002, both by Jonathan Samn, are hereby incorporated by reference in their entireties.

BACKGROUND OF THE INVENTION

1. Field of the Invention

This is a continuation of U.S. patent application Ser. No. 11/336,317, filed on Jan. 20, 2006, currently under notice of allowance, which was a continuation of U.S. patent application Ser. No. 10/081,021, filed on Feb. 21, 2002, now issued as U.S. Pat. No. 7,051,049, both of which were filed by Jonathan Samn. This invention relates to technologies and methods for managing personal contact information, and more particularly to management of online personal contact information for real-time online collaboration, conference and message facilities.

2. Background of the Invention

Online collaboration and messaging in real-time has become very popular in recent years. Programs and services such as America Online's ("AOL") Instant Messenger ("IM"), Microsoft's NetMeeting, and Lotus' Sametime are well-known programs and services which allow real-time white board collaboration, chatting, conference sessions and instant messaging via a corporate intranet and/or the Internet.

Using programs and services such as these, a plurality of online users may participate in a joint conference involving text messaging, application program sharing, and real-time photo and video sharing. Many companies have begun to use these services in place of actual face-to-face meetings of personnel which are physically or geographically dispersed.

During these "virtual" meetings, often times one participant will supply other participants with drawings, presentation graphics, and text for discussion. The ensuing discussion between the participants may be logged to a file for later review, which is more convenient than the record keeping mechanisms of actual physical face-to-face meetings. As such, these online virtual meetings and conversations provide advantages over traditional face-to-face meetings, not the least of which are automatic record keeping, reduced travel costs and greater convenience.

Figure 3:
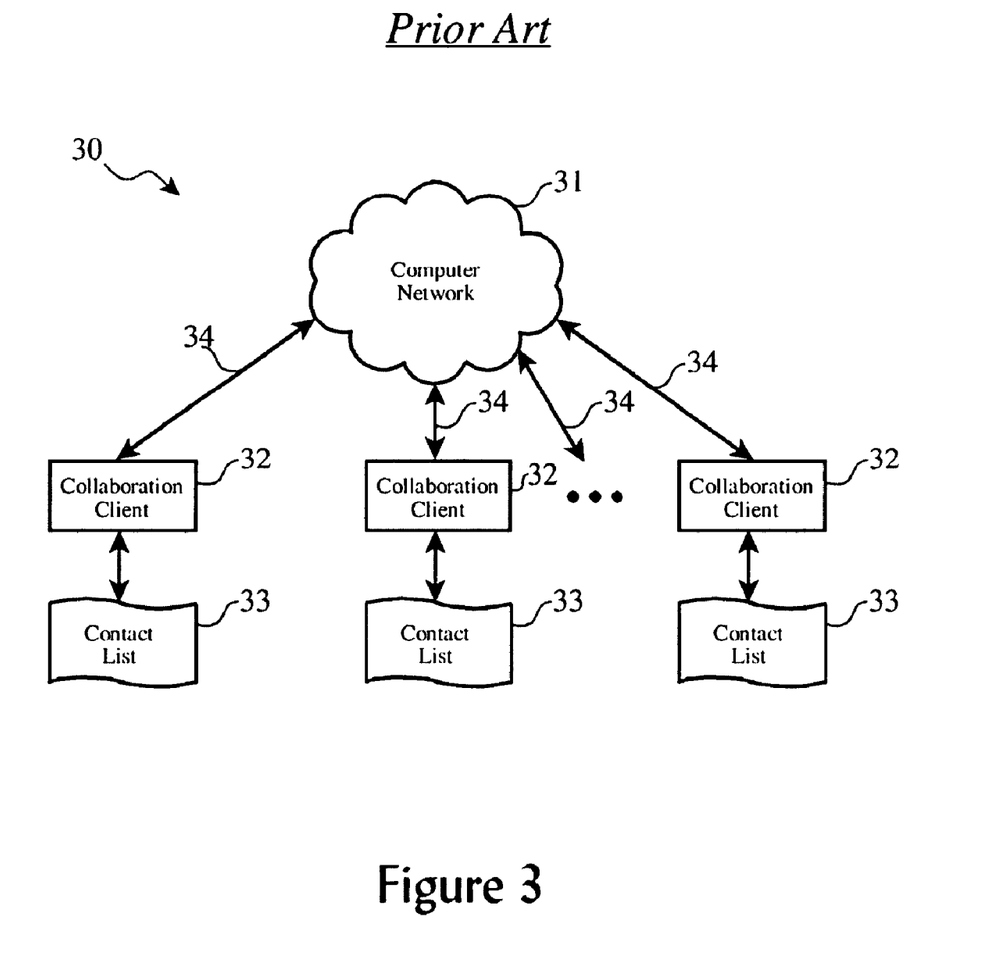
FIG. 3 shows an organization of system components for typical real-time virtual online collaboration, meeting and messaging systems.

Turning to FIG. 3, the arrangement of components of these types of real-time online collaboration systems is shown. A number of collaboration clients (32) are interconnected through a computer network (31). These collaboration clients typically comprise a personal computer equipped with software such as Netscape's Navigator[™], AOL's Instant Messenger[™], or Lotus' Sametime Connect[™]client product. These collaboration clients (32) may also include other computing platforms such as personal digital assistants ("PDA") and advanced web-enabled wireless telephones.

The collaboration clients (32) may interface to the computer network (31) through a number of well-known technologies including, but not limited to, Transmission Control/Internet Protocol ("TCP/IP"), dial-up modems, cable modems, asymmetric digital subscriber line ("ADSL"), or other interface technologies such as wireless interfaces.

Typically, the collaboration client (32) maintains a local contact list (33), such as AOL Instant Messenger's "buddy list" or Netscape Navigators "address book." These contact lists (33) may take the form of simple text files, or as advanced as database files. In some cases, the contact list are stored in proprietary formats.

When an online meeting or collaboration session is established, each new participant may supply the other participants with his or her email address as he or she logs into the session. The other participants may then chose to store that email address in their local contact list. In some cases, such as with the Instant Messenger product, there are other options for users to transmit their entire contact list to other meeting participants.

In general, however, these email addresses as well as any other participant contact information which is exchanged between participants is defined and by the participants themselves. This means that a participant logging in to a virtual meeting may supply accurate and complete information regarding his or her email address and other contact data, such as telephone and company location. However, a participant may choose not to supply some of this information, or may supply incorrect information.

Another method for exchanging personnel information and automatically storing it into such a contact list is called a "vCard". A vCard is a data record that may be attached automatically to an email message, if an email user desires to share his or her vCard with recipients of his or her messages.

A vCard which may contain a number of personal information data items as defined by the sender or originator. This may include email address (e.g. "return email address"), personal or company physical address, telephone numbers, and other descriptive information as defined by the sender.

vCards are an industry standard format data developed by a consortium including Apple, ATT, IBM, and others. Responsibility for maintaining and evolving the vCard specification was assumed by the Internet Mail Consortium ("IMC") in 1996.

By attaching vCards to an email message, a sender may enable the recipient to automatically store information into his or her contact list which is contained in the vCard. For example, a sender of an email message may wish to enable a recipient to automatically store the sender's name, email address, telephone number, position title, and company name into the recipient's address book without having to type it. Upon receipt, the recipient can select an automatic function in his or hers email client software which extracts the information from the attached vCard and stores it into his or her local address book. Later, the recipient may use that information in the address book to address new messages, export to other application programs such as word processors and contact managers, and to load into other databases.

As all of these currently available methods and systems rely on information which is defined and supplied by the sender or the originator of the information, such as a newly joined member of a virtual online conference, these methods and systems are subject to inconsistencies and inaccuracies in the data which may be stored into the recipient's or other participant's address books or contact lists.

For example, one participant in a online conference may supply a full set of information including his name, job title, telephone numbers, and company name. Another participant in the same conference may only supply his email address. When all of the participants in the conference store all of the information supplied by the other participants into their local contact lists, they may later find that their contact list has varying levels of degree of details in the information about each of those participants (and may contain errors).

Later, when one of the participants wants to contact another participant, such as by making a telephone call to that participant, he may or may not be able to find that telephone number based upon the information which was or was not supplied by the participant during the online conference.

Therefore, as the vCard industry standard and as the proprietary information standards of the various online conferencing services and suppliers do not assure accuracy or enforce uniformity of detail of the information supplied by online conference participants, the very flexibility of the system becomes a disadvantage of the systems as well.

Therefore, there is a need in the art for a system and a method which allow participants of online conferences and collaboration sessions to automatically store reliable and accurate information regarding the participants of those sessions. There is also a need in the art for this system and method to provide a consistent level of detail of information about each participant so that the participants may rely upon the contents of their local contact list in the future.

BRIEF DESCRIPTION OF THE DRAWINGS

The following detailed description when taken in conjunction with the figures presented herein provide a complete disclosure of the invention.

SUMMARY OF THE INVENTION

A real-time chat and conference contact information manager which, during a real-time online chat, online meeting, or online collaboration session between multiple participants, receives identification items associated with addition of a new participant; stores the received identification data item in a contact record in a local collaboration client contact list; triggered by the storing, extracts a search key value for each data item of the contact record, including at least an email address value associated with the new participant; uses the search key value to search a trusted administered contact information store for corresponding data items; and modifies the contact record to include the corresponding data items from said trusted administered contact information data store.

This allows each participant in such an online meeting or conversation to rely upon his or her contact list to contain a consistent level of information regarding each participant in previously conducted meetings and conversations, avoids the entry of inaccurate and potentially deceptive participant information into the contact list, and allows for reliable communication to the members of a participant's contact list.

DETAILED DESCRIPTION OF THE INVENTION

The invention is preferably realized as a feature or addition to the software already found present on well-known computing platforms such as personal computers, web servers, and web browsers. These common computing platforms can include personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 1:
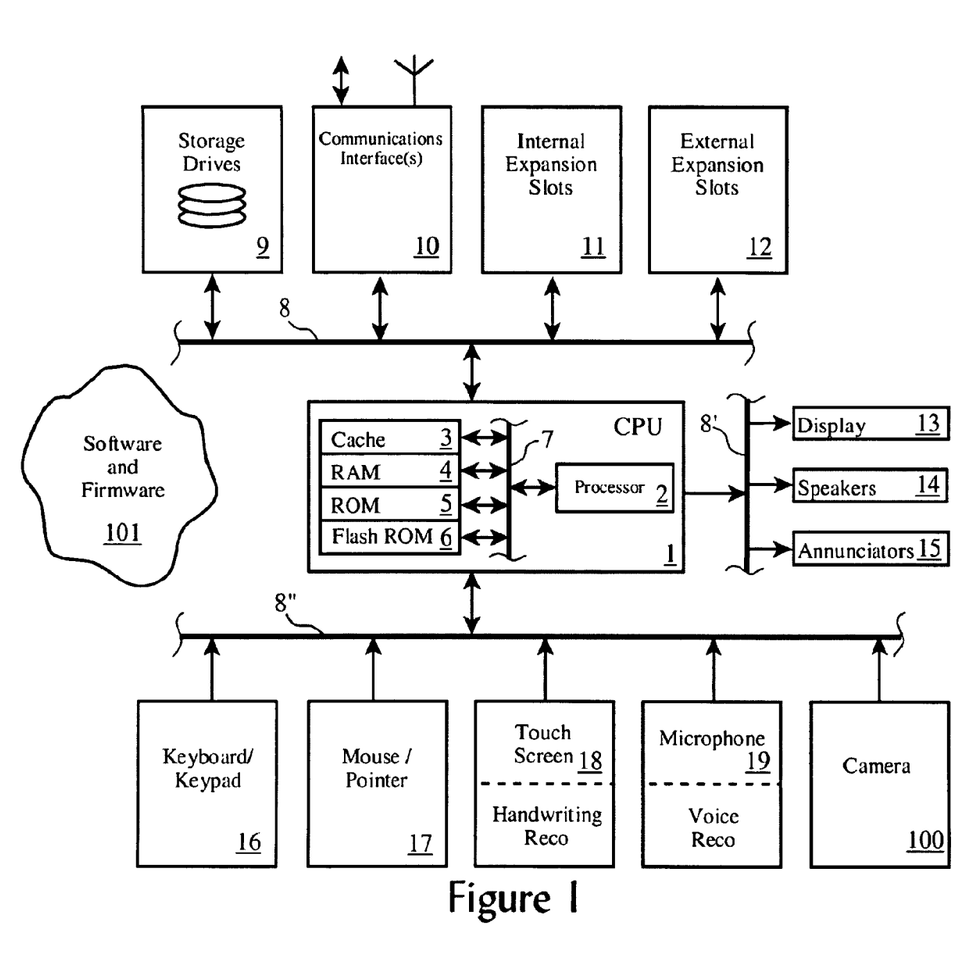
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1) ("CPU"), which is typically comprised of a microprocessor (2) associated with random access memory ("RAM") (4) and read-only memory ("ROM") (5). Often, the CPU (1) is also provided with cache memory (3) and programmable FlashROM (6). The interface (7) between the microprocessor (2) and the various types of CPU memory is often referred to as a "local bus", but also may be a more generic or industry standard bus.

Many computing platforms are also provided with one or more storage drives (9), such as a hard-disk drives ("HDD"), floppy disk drives, compact disc drives (CD, CD-R, CD-RW, DVD, DVD-R, etc.), and proprietary disk and tape drives (e.g., Iomega Zip[™] and Jaz[™], Addonics SuperDisk[™], etc.). Additionally, some storage drives may be accessible over a computer network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint[™]. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc.

The computing platform is also provided with one or more software and firmware (101) programs to implement the desired functionality of the computing platforms.

Figure 2:
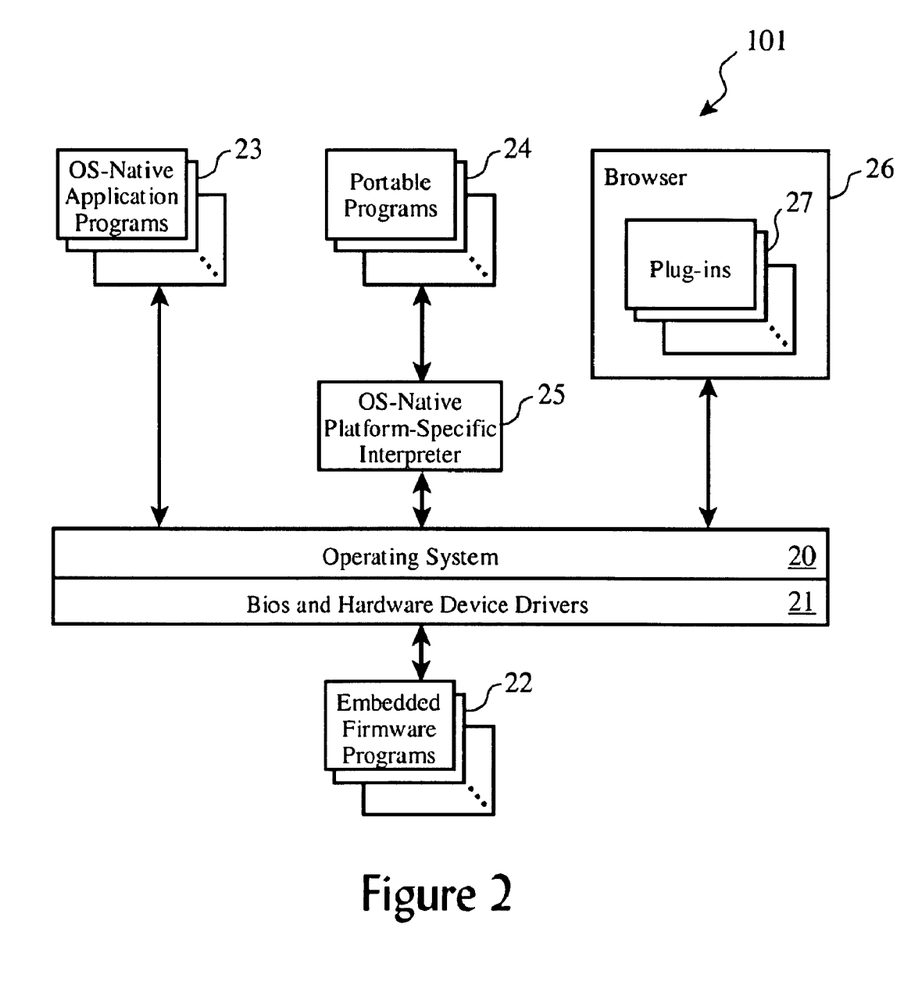
FIG. 2 shows a generalized organization of software and firmware associated with the generalized architecture of FIG. 1.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java[™] scripts and programs.

Often, computing platforms are also provided with a form of web browser or micro-browser (26), which may also include one or more extensions to the browser such as browser plug-ins (27).

The computing device is often provided with an operating system (20), such as Microsoft Windows[™], UNIX, IBM OS/2[™], LINUX, MAC OS[™] or other platform specific operating systems. Smaller devices such as PDA's and wireless telephones may be equipped with other forms of operating systems such as real-time operating systems ("RTOS") or Palm Computing's PalmOS[™].

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV[™] units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

We now turn our attention to description of the method of the invention and it's associated components. It is preferably realized as a standalone executable script, which accesses and modifies certain system files and resources as described in more detail in the following paragraphs, but may well be integrated into existing online collaboration client software such as Instant Messenger[™], Navigator[™] or Internet Explorer[™] without departing from the spirit and scope of the invention.

According to the preferred embodiment, the invention is implemented to cooperate with Lotus' Sametime product and IBM's BluePages corporate personnel contact database.

IBM's BluePages is an administered database containing personnel contact information, including name, division, location, mailing address, email address, supervisor, telephone number, and fax number. It can be accessed or queried over a corporate intranet through a number of utilities, including a Microsoft Windows-based graphical user interface program, or a DOS-based command line. In alternative embodiments of the invention, any administered contact information database may be accessed by the invention, such as an online services members database (e.g. Yahoo!'s members directory or white pages, AOL IM's directory service, etc.), through any number of query methods including but not limited to SQL.

Lotus' Sametime[™] product supports immediate communication with people across the hall or around the world, through secure text message, audio and video, or full collaborative meetings.

The Sametime[™] product family includes the Sametime [™] server, the Sametime Connect Client[™], and a range of Application Developer Tools. The Sametime Server was designed to be T-120 compliant and inter works with Microsoft's NetMeeting service.

The Sametime Server also works seamlessly with popular web browsers as well as Lotus Notes[™], and has audio and video capabilities to enhance a user's online experience.

The Sametime Connect client program lets users find other team members who are concurrently online, and to create personalized lists of team members and colleagues in a contact list. This contact list is stored as a text file on the computing platform on which the Sametime Connect client is running, which makes interfacing to this contact list particularly straightforward. For alternate realizations of the invention with other collaboration client products, the contact list may be a proprietary format file or database, requiring use of appropriate querying and modification functions and interfaces.

Once a team member is aware of who is online, immediate communication is easy. A single mouse-click lets users send an message instantly to any other team member, start a chat session with several people, or establish an instant, online meeting.

Users can take advantage of Sametime's shared-objects capabilities to quickly move into an application-sharing or whiteboard session. Session participants can share a screen frame, their desktops or applications with others. Sametime's shared-objects capabilities can also be used to show presentations and drawings on the whiteboard.

With application sharing, users can share any application, from desktop word processing or spreadsheets, to project management software, without requiring other users to have that application installed.

Like many of the other online collaboration products, Sametime allows a session participant to automatically store another session participant's email address into his or her own contact list.

Very often, the BluePages are used by a participant to find phone information, location or division details for other corporate employees subsequent to a online meeting or collaboration session as this information is not captured into the user's Sametime contact list. For example, two days after an online meeting is conducted, a first participant may wish to telephone a second participant instead of sending the second participant an email. So, the first participant would access BluePages, search on the second participant's email address, and usually find the telephone number of the second participant.

A similar process may be followed by a user of NetMeeting [™] or Instant Messenger[™] by accessing alternate administered personal contact information databases, such as online white pages (administered by telephone operating companies) or members directories (administered by the club or service management).

However, this process sometimes has the problem in that the administered contact database (e.g. BluePages, white pages, members directory, etc.) server may be down, or query responses may be very slow which, in mission critical situations, may mean the difference between catching a person before they leave an office in a different part of the world, or having to wait until the next day to hold the telephone conversation.

To solve this problem, the invention retrieves phone information and potentially other available contact information from an administered contact database, such as BluePages, for each user listed in a contact list, such as the Sametime contact list, and adds that retrieved information to the contact list used by real time collaboration client. According to a preferred embodiment, the invention uses email addresses as search keys, but those skilled in the art will readily recognize that other available data items (e.g. name, employee or member number, etc.) may be used for searching keys as well. Preferably, the invention also removes invalid entries from the contact list, as well.

Figure 4:
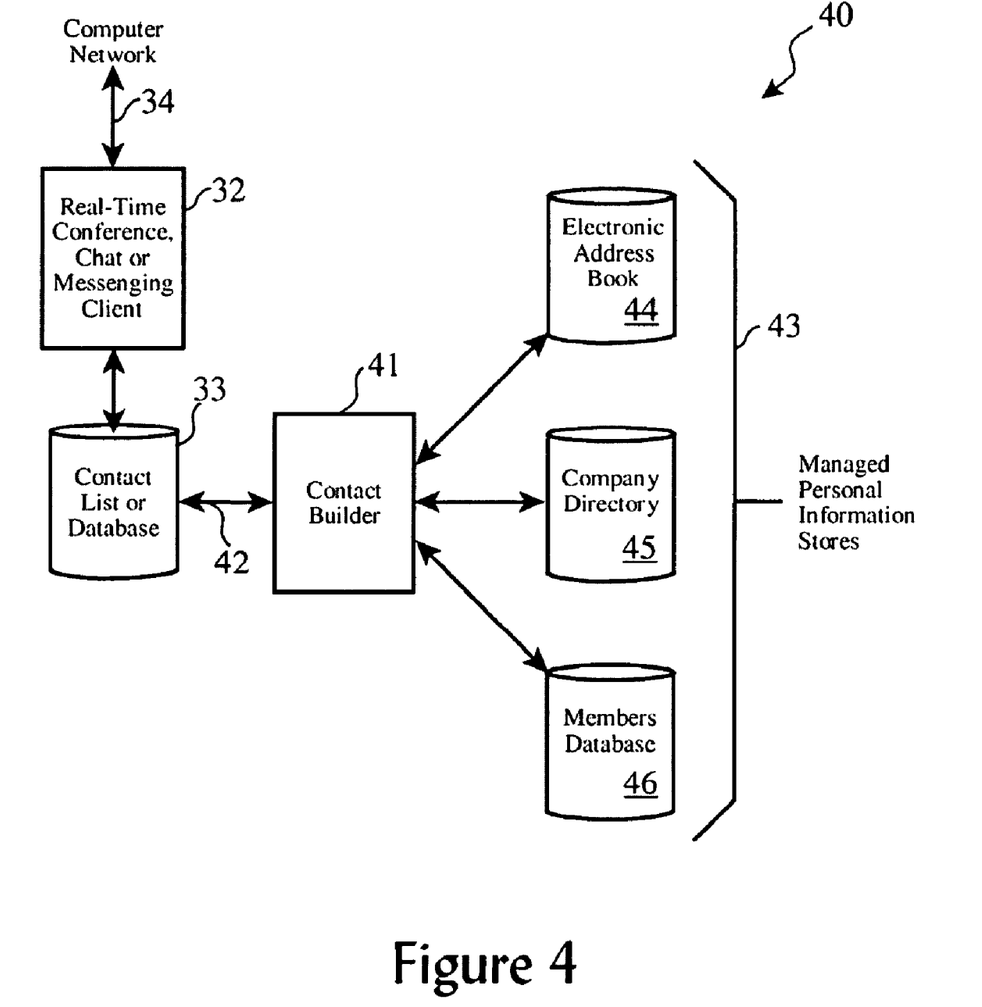
FIG. 4 illustrates the organization of components according to the present invention.

Turning to FIG. 4, the arrangement of components (40) according to the preferred embodiment of the invention is shown. A real time conference chat or messaging client (32) is typically provided with a contact list or database (33) on the user's local computing platform persistent storage such as on a hard drive. The contact builder script or executable program (41) is provided to interface (42) to the contact database or list (33), according to the preferred embodiment in association with the Sametime connect client.

The contact builder (41) interfaces to the Sametime contact list (33) through opening the text file of the list and scanning in lines looking for incomplete records for team members stored in the list.

Table 1 shows a typical record construction of the text-based contact list file used by Sametime. In this format, semi-colons ";" are used to separate data items within a contact record, and end-of-line characters <EOL> are used to separate contact records. Other implementations of the invention with other real-time collaboration clients products may require the interface (42) to the contact list (43) to be more sophisticated, such as a SQL database interface.

TABLE 1

Example Simple Text File Contact List

<full_name>; <nick_name>;<email>;<tel_1>;<tel_2>;<phys_addr>
    <company>; <title>; <EOL>
smith, john; johnny; jsmith@company.com; 703-111-2222;;;Company
Inc.;;;
doe, jane; janey; janey2002@aol.com;;;;;;

.
.
.

<end_of_file>

The contact builder (41) also interfaces one or more managed personal information stores (43). This may include such things as an Netscape address book (44), a company directory (45) such as IBM BluePages, or a member's database (46). Interfaces to these managed personal information stores typically use well-known methods such as Hyper Text Markup Language ("HTML") or SQL.

According to the preferred embodiment, implementation and cooperation with IBM BluePages products requires only the use of a DOS command line function.

Figure 5:
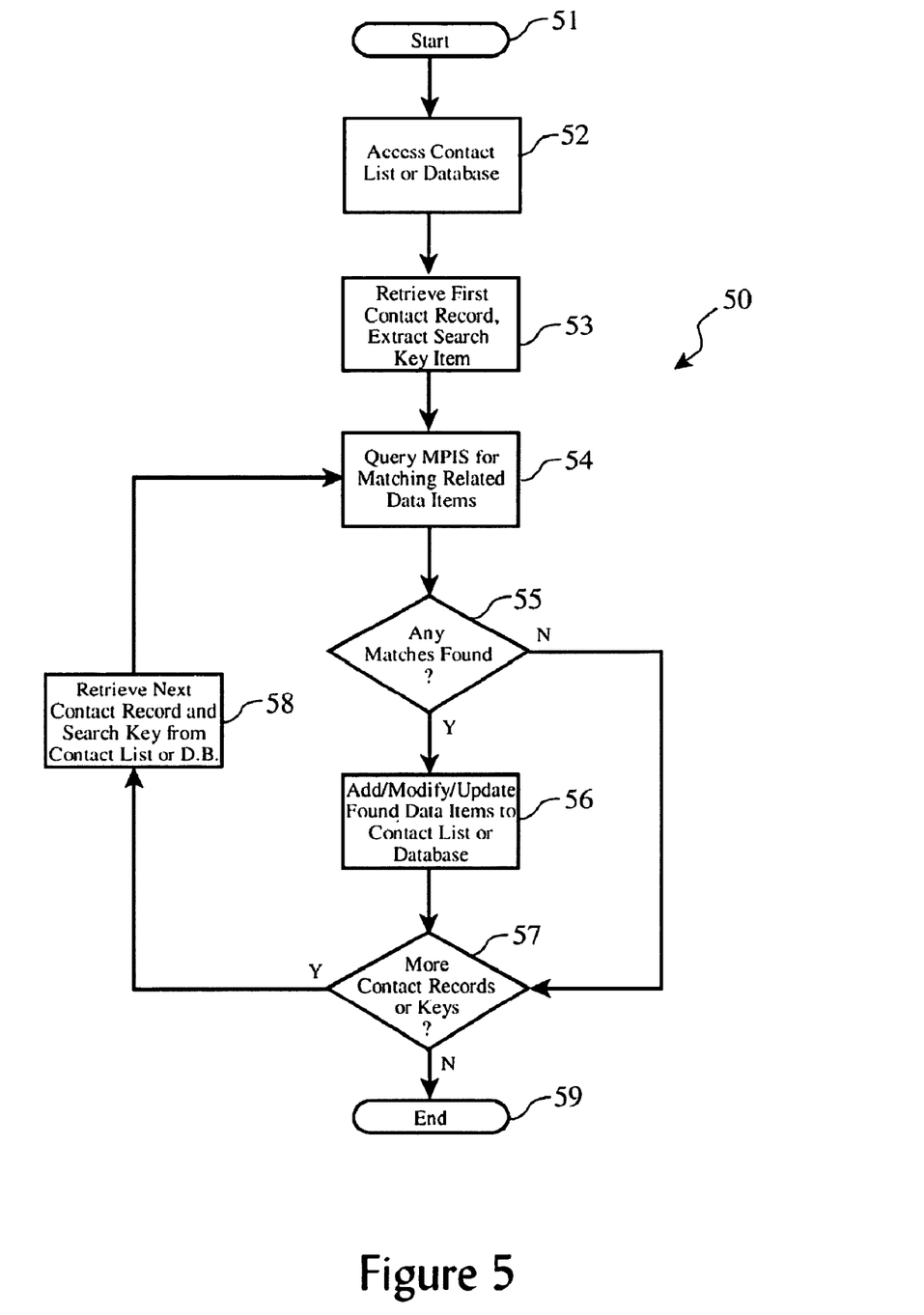
FIG. 5 sets forth the logical process of the preferred embodiment of the present invention.

Turning to FIG. 5, the process (50) of the invention is shown in more detail. The process is started (51) either by manual invocation or by automatic triggering, such as on a timed basis or due to a detected change to the user's contact list.

First, the contact list or database is accessed (52), such as by opening a text file or obtaining a reference to a database query function. The first record or entry in the contact list is retrieved, and a first search key item is retrieved from that record (53). According to the preferred embodiment, the email address of that particular record is extracted. An email address is normally the most unique data key available to use as a search key. In an enhanced embodiment, multiple keys can be extracted (e.g. email address, location, etc.) to produce more exact search results.

Then, unless all other possible elements are present in the record, such as a telephone number for that contact and location or other desired data items, the managed personal information store may be queried (54) for matching related records and data items using the search key item previously retrieved from the record (53).

If any matching entries in the managed personnel information store are found (55), then the entry in the contact list or database is modified (56) or otherwise updated (56) to include the additional data items found in the managed personal information store record.

If no matching entries in the managed personal information storer are found (55), then processing may simply proceed to the next entry or record in the contact list. According to the preferred embodiment, the user may optionally enable the invention to automatically delete entries in his or her contact list if no matching or confirming records are found in the managed personal information store.

Next, if more records exist in the contact list or the database (57), then the next search key item from the next contact list record or entry (58) is retrieved. This next key item is then processed by querying the managed personal information store for matching related data items (54), and updating (56) any matched entries in the contact list or database.

This process is continued until all entries in the contact list or database have been updated and expanded to include all available information (or all desirable information) from the managed personal information store.

As the invention may be run periodically on a timed basis, upon detection of changes to the contact list, or by manual invocation, a user may control how often his or her contact list is updated and expanded to include other data from their most trusted administered contact database.

While certain examples and details of a preferred embodiment have been disclosed, it will be recognized by those skilled in the are that variations in implementation such as use of different programming methodologies, computing platforms, and processing technologies, may be adopted without departing from the spirit and scope of the present invention. Therefore, the scope of the invention should be determined by the following claims.

What is claimed is:

1. A computer memory comprising:
a computer readable memory device suitable for encoding software programs; and
one or more software programs encoded by said computer readable memory configured to:
during a real-time online chat, online meeting, or online collaboration session between a plurality of participants, receive one or more identification data items associated with said addition of a new participant to said chat, meeting, or collaboration;
store said received identification data item in a contact record in a local collaboration client contact list, said contact record having a plurality of fields; and
triggered by storing of said identification data item in said local collaboration client contact list and during said chat, meeting or collaboration session:
extract a search key value for each data item of said contact record, said search key comprising at least an email address value associated with said new participant;
use said search key values to search a trusted administered contact information store for corresponding data items, contents of said administered contact information store being managed by a database administrator; and
modify said contact record to include said corresponding data item from said trusted administered contact information data store.

2. The computer memory as set forth in claim 1 wherein accessing said local contact list comprises accessing a text file.

3. The computer memory as set forth in claim 1 wherein accessing said local contact list comprises accessing a database file.

4. The computer memory as set forth in claim 1 wherein accessing said local contact list comprises accessing an online address book file.

5. The computer memory as set forth in claim 1 wherein using said search key value to retrieve from an administered contact information store comprises accessing a corporate personnel information database.

6. The computer memory as set forth in claim 1 wherein using said search key value to retrieve from an administered contact information store comprises accessing an electronic telephone directory.

7. The computer memory as set forth in claim 1 wherein using said search key value to retrieve from an administered contact information store comprises accessing an electronic members directory.

8. The computer memory as set forth in claim 1 wherein modifying said contact record comprises adding a telephone number to said retrieved contact record.

9. The computer memory as set forth in claim 1 wherein said computer readable memory device comprises a memory device selected from a group of a random access memory, a read-only memory, a computer tape, and a computer disk.

10. A system comprising:
a computer hardware means configured to perform a logical process; and
a logical process executed by said computer hardware means, configured to:
during a real-time online chat, online meeting, or online collaboration session between a plurality of participants, receive one or more identification data items associated with said addition of a new participant to said chat, meeting, or collaboration;
store said received identification data item in a contact record in a local collaboration client contact list, said contact record having a plurality of fields; and
triggered by storing of said identification data item in said local collaboration client contact list and during said chat, meeting or collaboration session:
extract a search key value for each data item of said contact record, said search key comprising at least an email address value associated with said new participant;
use said search key values to search a trusted administered contact information store for corresponding data items, contents of said administered contact information store being managed by a database administrator; and
modify said contact record to include said corresponding data item from said trusted administered contact information data store.

11. The system as set forth in claim 10 wherein accessing said local contact list comprises accessing a text file.

12. The system as set forth in claim 10 wherein accessing said local contact list comprises accessing a database file.

13. The system as set forth in claim 10 wherein accessing said local contact list comprises accessing an online address book file.

14. The system as set forth in claim 10 wherein using said search key value to retrieve from an administered contact information store comprises accessing a corporate personnel information database.

15. The system as set forth in claim 10 wherein using said search key value to retrieve from an administered contact information store comprises accessing an electronic telephone directory.

16. The system as set forth in claim 10 wherein using said search key value to retrieve from an administered contact information store comprises accessing an electronic members directory.

17. The system as set forth in claim 10 wherein modifying said contact record comprises adding a telephone number to said retrieved contact record.

18. The system as set forth in claim 10 wherein said computer hardware means comprises a microprocessor.

* * * * *